United States Patent
Gao

(10) Patent No.: US 10,863,111 B2
(45) Date of Patent: Dec. 8, 2020

(54) METHOD AND SYSTEM FOR GENERATING A COMPOSED TOP-VIEW IMAGE OF A ROAD

(71) Applicant: CONTINENTAL AUTOMOTIVE GmbH, Hannover (DE)

(72) Inventor: Bingtao Gao, Chengdu (CN)

(73) Assignee: CONTINENTAL AUTOMOTIVE GmbH

(*) Notice: Subject to any disclaimer, the term of this patent is extended or adjusted under 35 U.S.C. 154(b) by 14 days.

(21) Appl. No.: 16/345,125

(22) PCT Filed: Oct. 26, 2016

(86) PCT No.: PCT/CN2016/103353
§ 371 (c)(1),
(2) Date: Apr. 25, 2019

(87) PCT Pub. No.: WO2018/076196
PCT Pub. Date: May 3, 2018

(65) Prior Publication Data
US 2019/0289224 A1 Sep. 19, 2019

(51) Int. Cl.
*H04N 7/00* (2011.01)
*H04N 7/18* (2006.01)
(Continued)

(52) U.S. Cl.
CPC .......... *H04N 5/2628* (2013.01); *B60R 11/04* (2013.01); *G06K 9/00791* (2013.01); *G06T 3/4038* (2013.01); *H04N 5/265* (2013.01)

(58) Field of Classification Search
USPC ....................................................... 348/148
See application file for complete search history.

(56) References Cited

U.S. PATENT DOCUMENTS

2007/0124783 A1* 5/2007 Ahiska ............... H04N 5/23206
725/105
2008/0253685 A1* 10/2008 Kuranov ............... G06T 3/4038
382/284
(Continued)

FOREIGN PATENT DOCUMENTS

CN 103377470 10/2013
CN 104680501 6/2015
(Continued)

OTHER PUBLICATIONS

International Search Report issued in corresponding application No. PCT/CN2016/103353.
(Continued)

*Primary Examiner* — Nigar Chowdhury
(74) *Attorney, Agent, or Firm* — Yakov S. Sidorin; Quarles & Brady LLP

(57) ABSTRACT

A top-view image of a road is composed from at least two images taken by a vehicle-mounted camera. A speed and/or an acceleration of the vehicle is recorded, as well as at least two sequential images. A first image is selected for further processing. A first selected area of the first selected image is determined, located in a zone of the image with minimum distortion. A second image captured later is selected for further processing. A second area of the second image is selected in a zone of the image with minimum distortion and located such that image content shown at a lower border of the second area is adjacent to image content at an upper border of the first selected area. The first and second selected areas are transformed into a top-view perspective, and the transformed first and second selected areas stitched together for generating a composed top-view image.

10 Claims, 5 Drawing Sheets

(51) Int. Cl.
*G09B 9/00* (2006.01)
*H04N 5/262* (2006.01)
*B60R 11/04* (2006.01)
*G06K 9/00* (2006.01)
*H04N 5/265* (2006.01)
*G06T 3/40* (2006.01)

(56) References Cited

U.S. PATENT DOCUMENTS

| | | | | |
|---|---|---|---|---|
| 2009/0073324 A1* | 3/2009 | Tan | ............... | H04N 5/2628 348/745 |
| 2016/0088287 A1* | 3/2016 | Sadi | ............... | G03B 35/08 348/43 |
| 2016/0180501 A1* | 6/2016 | Mallet | ............... | G06T 5/006 382/164 |
| 2016/0182838 A1* | 6/2016 | Gredegard | ............... | H04N 5/23296 348/240.3 |
| 2016/0307059 A1* | 10/2016 | Chaudhury | ............... | G06K 9/00463 |
| 2016/0373647 A1* | 12/2016 | Garcia Morate | ............... | G06T 5/003 |
| 2017/0061686 A1* | 3/2017 | Yu | ............... | H04N 5/23296 |
| 2017/0126968 A1* | 5/2017 | Somanath | ............... | G06T 3/4038 |

FOREIGN PATENT DOCUMENTS

| | | |
|---|---|---|
| CN | 105957010 | 9/2016 |
| JP | 2007099261 A | 4/2007 |
| JP | 2009205403 A | 9/2009 |
| WO | 2009057410 A1 | 5/2009 |

OTHER PUBLICATIONS

Written Opinion issued in corresponding application No. PCT/CN2016/103353.

Japan Patent Office. Notification of Reasons for Refusal for application 2019-544949. dated Jul. 29, 2020. With translation.

* cited by examiner

METHOD AND SYSTEM FOR GENERATING A COMPOSED TOP-VIEW IMAGE OF A ROAD

CROSS REFERENCE TO RELATED APPLICATION

This is a U.S. national stage of application No. PCT/CN2016/103353, filed on Oct. 26, 2016, the content of which is incorporated herein by reference.

1. FIELD OF THE INVENTION

The present invention pertains to mapping or scanning of at least a part of a road, in particular by stitching together images captured by a vehicle while driving on that road.

2. DESCRIPTION OF THE PRIOR ART

Advanced driver assistance systems and autonomously driving cars require high precision maps of roads and other areas on which a vehicle can drive. Determining a vehicle's position on a road within a lane of a road with an accuracy of a few centimeters cannot be achieved using conventional satellite navigation systems, e.g., GPS, Galileo, GLONASS, or other known positioning techniques like triangulation and the like. However, in particular when a self-driving vehicle moves on a road with multiple lanes, it needs to exactly determine its lateral and longitudinal position within the lane. One known way to determine a vehicle's position involves one or more cameras capturing images of road markings and comparing unique features of road markings in the captured images with corresponding entries in a database and their respective position. This way of determining a position provides sufficiently accurate results only when the database provides highly accurate position data and is updated regularly or at suitable intervals. Road markings may be captured and registered by special purpose vehicles that capture images of the roads while driving, or may be extracted from aerial photographs or satellite images. The latter variant may be considered advantageous since a perpendicular view, or top-view image shows little distortion of road markings and other features on substantially flat surfaces. However, aerial photographs and satellite images may not provide sufficient detail for generating highly accurate maps of road markings and other road features.

SUMMARY OF THE INVENTION

It is an object of the present invention to provide an improved method and a system for generating, or composing, a top-view image of at least parts of a road. The object, and variations and developments thereof, is attained by the method and the system as claimed in the attached claims.

In accordance with an aspect of the present invention, a method of generating a composed top-view image of at least a part of a road from at least two images taken by a vehicle-mounted, forwardly facing camera from a non-vertical perspective with respect to a surface on which the vehicle is moving comprises recording a speed and/or an acceleration of the vehicle in and/or around each main axis of a three-dimensional space. Alternatively or in addition, an orientation of the vehicle in the three-dimensional space and/or a distance covered is recorded.

In an aspect of the invention, the method further comprises recording a sequence of at least two images while the vehicle is moving. In case a frame frequency of the camera is fixed a corresponding time stamp is added to each recorded image. In combination with the vehicle speed this allows for selecting images to be used in the generating or composition process that yields a top-view image of at least parts of a road from the sequence of images. In case the frame frequency of the camera is not fixed, each image is captured at a point in time that is determined with respect to one or more of a speed of the vehicle, a covered distance, a rotation of the vehicle around a transverse axis, a translation of the vehicle along a vertical axis, or a combination thereof, as will be explained with reference to figures.

In accordance with an aspect of the invention, the method further comprises selecting a first image from the sequence of at least two images for further processing, and selecting a first selected area in the first selected image. The first selected area is located in a zone of the image in which the camera optics cause minimum distortion.

In accordance with an aspect of the invention, the method further comprises selecting a second image from the sequence of at least two images for further processing, which second image is captured later than the first selected image. The second image is selected such that a second area can be selected in the second selected image, which second selected area is located in the zone of the image in which the camera optics cause minimum distortion. In addition, the second area is located such that image content shown at a lower border of the second area is adjacent to image content shown at an upper border of the first selected area in the first selected image.

In this context image content refers visible objects or features in a scene of an image. Adjacency of image content shown at a lower border of the second area and at an upper border of the first area means that pixels within a first selected area of a first image, and pixels within a second selected area of a second image, which pixels partly represent a feature or an object, can be processed in such a way that the pixels of the first and second selected areas taken together represent a larger, coherent part of the feature or object. In other words, after processing, the first and second areas can be combined to show a larger portion of a feature or an object than each of the first or second areas shows individually, without a gap in between. In light of the foregoing definition adjacency may include partial overlapping of first and second selected areas.

The first and second selected areas may be located at the same position within the first and second selected images. The terms "upper" and "lower" indicate a respective border's position with respect to a two-dimensional image, in which a horizontal axis, or x-axis, extends from a left side of the image to a right side of the image, and a vertical axis, or y-axis, extends from a lower side of the image in upwardly direction to an upper side of the image. The expression "position within a selected image" with respect to a selected area indicates a location of the selected area at x- and y-positions, either covering ranges of x- and y-positions, or by using a reference point and an extension of the area in x- and y-direction. Borders of the first and second selected areas need not necessarily be aligned orthogonally with x- and y-directions of the image. Rather, the first and second selected areas may also be located at an angle with respect to the x- and y-directions. Also, the selected areas need not necessarily have the same size. Generally, the selected areas have a quadrilateral shape in which at least two opposite sides are parallel to each other, including a trapezoid or a rectangle. The shape may be selected depending on a camera perspective in such a way that the transformation of the selected area into the top view yields a rectangular form. The area may be selected depending on rotation of the vehicle around a longitudinal axis prevailing at the time when the image was captured, in order to compensate for changes of the perspective of the camera due to movements of the vehicle.

In case a frame rate of the camera is fixed, images may be selected depending on one or more of a speed of the vehicle, a rotation of the vehicle around a longitudinal axis, a rotation of the vehicle around a transversal axis and a translation of the vehicle along a vertical axis, targeting that an area showing image content adjacent to image content of a selected area in a previously selected image can be selected within a zone of minimum distortion in the currently selected image. In this case not each image of a sequence of images is necessarily selected, and even assuming a constant speed of the vehicle there is not necessarily a fixed number of images that are not used between two subsequently selected images. This allows for compensating uneven movements of the vehicle in which the camera is fixedly mounted, e.g., caused by speed bumps, potholes or other deformations of a road surface, which could shift the scene captured by the camera and thus the zone of minimum distortion of the camera.

In case a frame rate of the camera is not fixed, images may be captured by controlling a capturing trigger depending on one or more of a speed of the vehicle, a rotation of the vehicle around a longitudinal axis, a rotation of the vehicle around a transversal axis and a translation of the vehicle along a vertical axis, like in the previous example targeting that an area showing image content adjacent to image content of a selected area in a previously selected image can be selected within a zone of minimum distortion in the currently selected image. This, too, allows for compensating uneven movements of the vehicle in which the camera is fixedly mounted, e.g., caused by speed bumps or potholes, which could shift the scene captured by the camera and thus the zone of minimum distortion of the camera. However, since the point in time at which an image is captured is controlled, in this case each image that was captured is used for further processing in accordance with the present method. Both cases reduce the number of images to be subjected to further processing in accordance with the present method to a minimum.

The method further comprises transforming the first and second selected areas into a top-view perspective, and stitching the transformed first and second selected areas together for generating a composed top-view image. Transformations include, inter alia, rotation, zooming, stretching, but also operations to correct barrel, pincushion, keystone or perspective distortion.

The composed top-view image may be subjected to object recognition, for identifying features and/or elements of the road. For each of the identified features and elements of the road a location may be determined, e.g., from data representing vehicle speed or acceleration, optical characteristics of the camera, characteristics of the transformation applied for generating the top-view image, as well as from reference features identified in the composed image, whose position or location is known with high accuracy. The reference features may be obtained through accessing a database. The recognized features and elements may be added to a digital representation of the road, e.g., as a photographic representation thereof or in a digital repre-sentation, e.g., as a 3d-CAD vector or wire-frame model.

A system that executes the method includes a camera that captures the images, sensors for determining movements and/or a position and/or orientation of the vehicle, and one or more processing units that perform image selection, area selection, transformation and/or composition or generation of the desired top-view image. The one or more processing unit may include modules adapted to perform respective functions, which modules may be software modules or hardware modules, or a combination thereof.

BRIEF DESCRIPTION OF DRAWINGS

In the following section the invention will be described with reference to the attached drawings, in which.

DETAILED DESCRIPTION OF THE PRESENTLY PREFERRED EMBODIMENTS

Figure 1A:
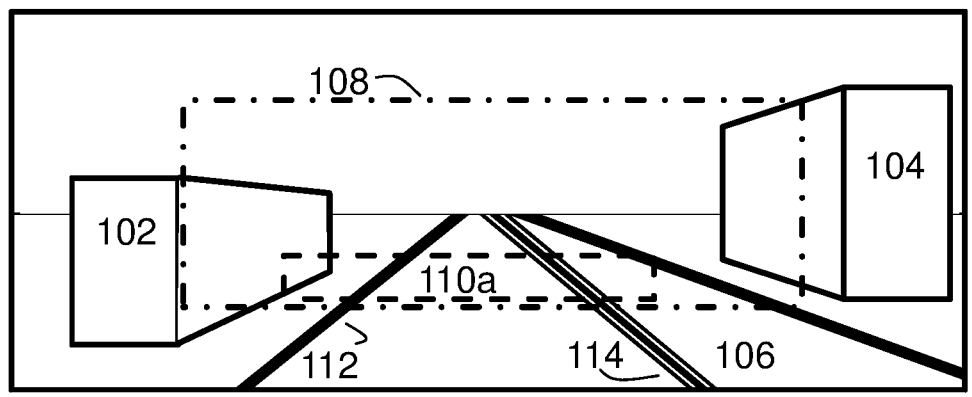
FIGS. 1a-1e show a first simplified scene captured by a camera and a selection and concatenation of areas in accordance with a first aspect of the invention.

In the drawings, identical or similar elements are indicated by the same reference signs.

FIG. 1a shows a first simplified scene as captured by a vehicle-mounted camera. Two buildings 102, 104, placed left and right of a two-lane road 106, respectively, are visible in the scene. A dash-dotted line 108 indicates a zone in which the camera optics causes minimum distortion. A first area 110a is selected for further processing, the first area being indicated by the dashed line. The selection is made such that features of the road 106 are located within the first area 110, in this example a left lane limiting line 112 and a lane separating line 114.

Figure 1B:
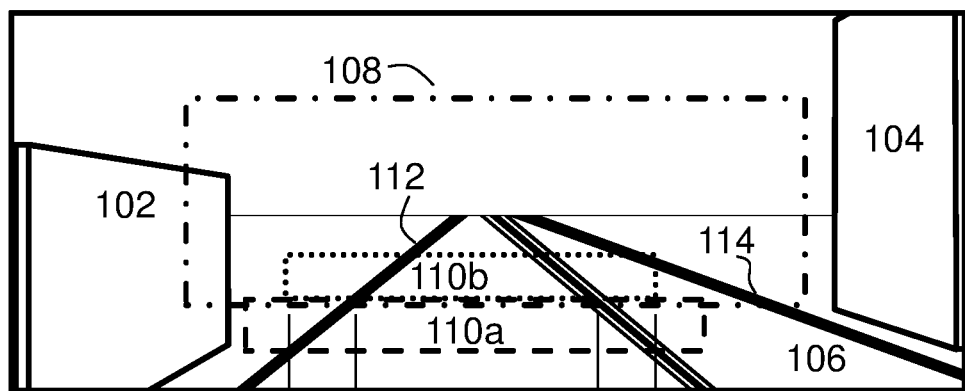
Figure 1C:
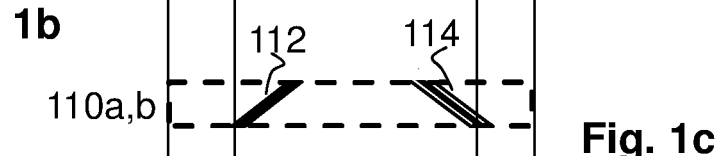

As the vehicle moves forward, features in the scene move towards the vehicle and ultimately pass the vehicle, leaving the scene captured by the camera. In FIG. 1b the vehicle has moved forward a certain distance, and the buildings are now located closer to the vehicle and thus appear larger than in FIG. 1a. The part of the scene that was located within the first selected area 110a is now located closer to the lower border of the image, mostly outside the zone in which the camera optics causes minimum distortion. However, this is irrelevant because the part has been captured in FIG. 1a and its content is processed further or stored for further processing. A second area 110b, indicated by the dotted line, is selected so as to share a border with the first area, i.e., a feature of the road 106 at an upper border of the first selected area 110a should be seamlessly adjacent to the same feature at a lower border of the second selected area 110b. The process is repeatedly carried out to select a large number of selected areas which, when lined up, or concatenated, provide a gapless image of road features along a section or a part of the road.

Figure 1D:
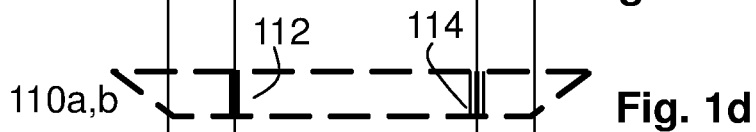
Figure 1E:
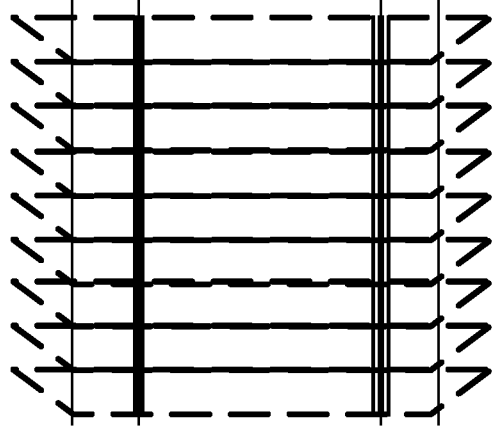

As the camera is mounted to the vehicle in a forwardly-facing manner, parallel structures on the road will appear in a perspective view, i.e., parallel lines appear to merge in a distant point. In order to allow for generating a top-view image of the road features the first and second selected areas are subjected to a transformation that produce a virtual top-views of the selected areas. A simplified representation of the transformation is shown in FIGS. 1e and 1d. FIG. 1e shows the image content of a selected area 110a or 110b from FIG. 1a and FIG. 1b. FIG. 1d shows a transformed image content of FIG. 1e, in which the converging lines 112 and 114 are now aligned parallel to each other, as they would appear in a top-view image taken from an elevated viewpoint, facing down. Due to the transformation the shape of the selected area is now a trapezoid.

The transformed images are aligned and lined up so as to form a virtual top-view image of the road features located within the selected areas along a part or a section of the road, as shown in FIG. 1e.

The thin solid lines connecting FIGS. 1b through 1e only serve as optical guides for tracking the features across the figures and do not form part of the processing.

Figure 2A:
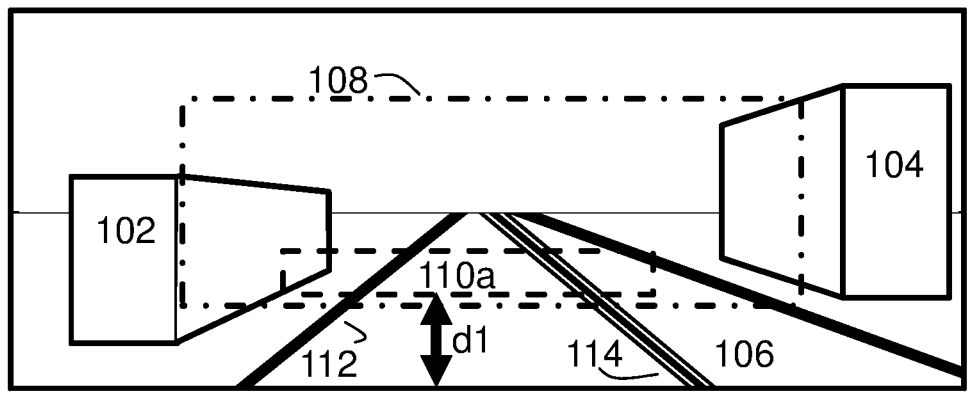
FIGS. 2a-2c show a second simplified scene captured by a camera and a selection of an area in accordance with a second aspect of the invention.
Figure 2B:
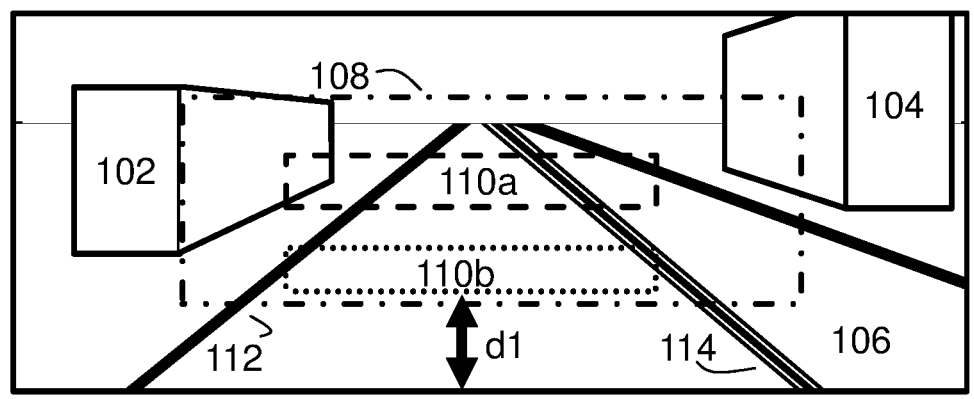
Figure 2C:
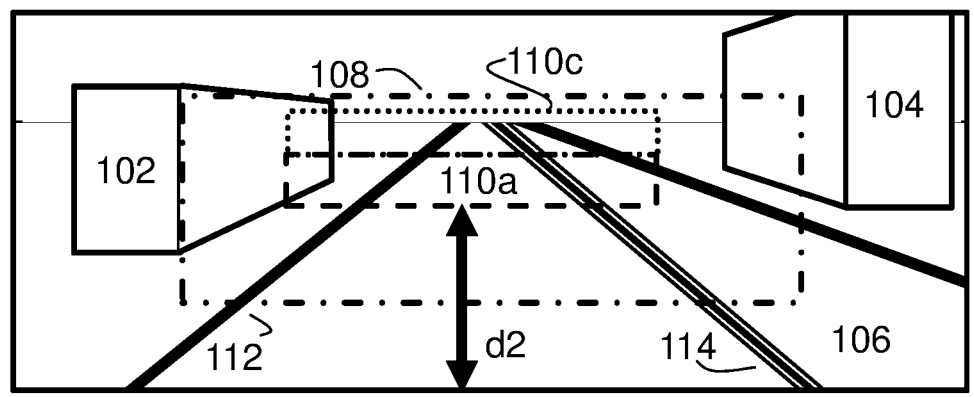

FIGS. 2a-2c show a second simplified scene captured by a camera and a selection of areas in accordance with a second aspect of the invention. The scene shown in FIG. 2a corresponds to the scene shown in FIG. 1a. The first selected area 110a is located at a distance d1 from the lower border of the image, just above the lower border of the zone 108 in which the camera optics causes minimum distortion.

In FIG. 2b the vehicle has moved forward just far enough so as to require a new image to be captured, but a speed bump or other deformation of the road surface (not shown in the figure) has caused the vehicle to be lower at the front than at the rear. As the camera is fixedly mounted to the vehicle the scene that is captured is shifted accordingly, as shown in FIG. 2b. The change in the vehicle position and thus the camera position can be described as a rotation of the vehicle around a transversal axis and/or a translation along a vertical axis. The first selected area 110a is shown in the figure for reference purposes. If the second area were selected to be in a location similar to the first selected area with respect to the borders of the image it would be located in the position indicated by the dotted-line area 110b. However, this does not provide a gapless connection between the first and second selected areas in a way that image content found a top border of the first selected area 110 is adjacent to image content found at the lower border of the second selected area 110b. In fact, the second selected area 110b of FIG. 2b would partly cover image content that was already captured at an earlier point in time.

In order to compensate for the motion of the vehicle and the camera the second selected area can either be shifted to a location that provides a gapless connection between the first and second areas in accordance with the requirements of the present method, or the image may be discarded. FIG. 2c shows a second selected area 110c that is shifted to be located such that image content at its lower border is seamlessly adjacent to content at the upper border of first selected area 110a. The second selected area 110c is now located at a distance d2 from the lower border of the image while still located within the zone 108 in which the camera optics causes minimum distortion. The motion of the vehicle may be detected using on-board sensors such as accelerometers and gyroscopes, but also by using image recognition techniques, or other suitable means.

Figure 3A:
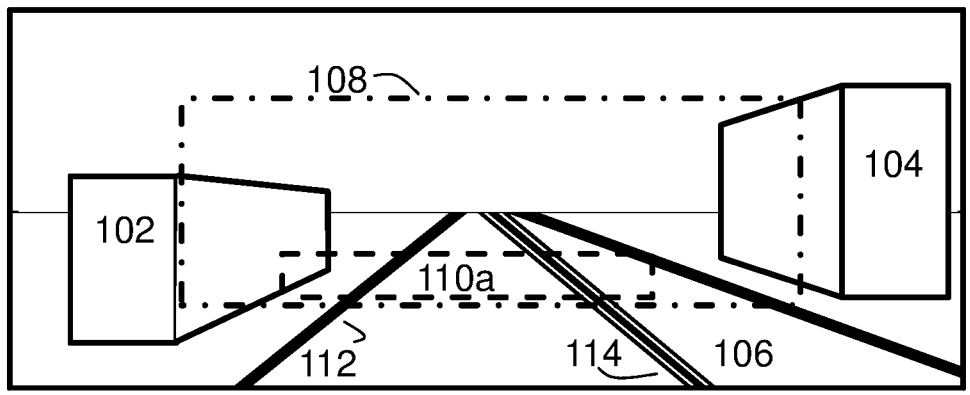
FIGS. 3a-3c show a third simplified scene captured by a camera and a selection of areas in accordance with a third aspect of the invention.
Figure 3B:
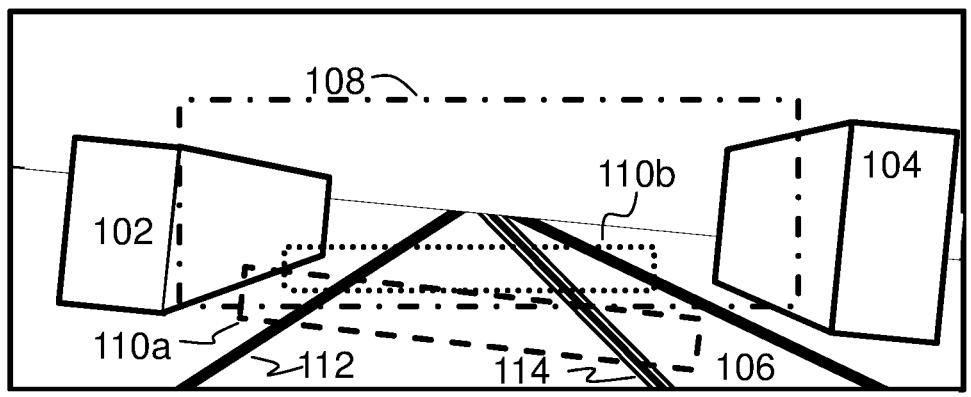
Figure 3C:
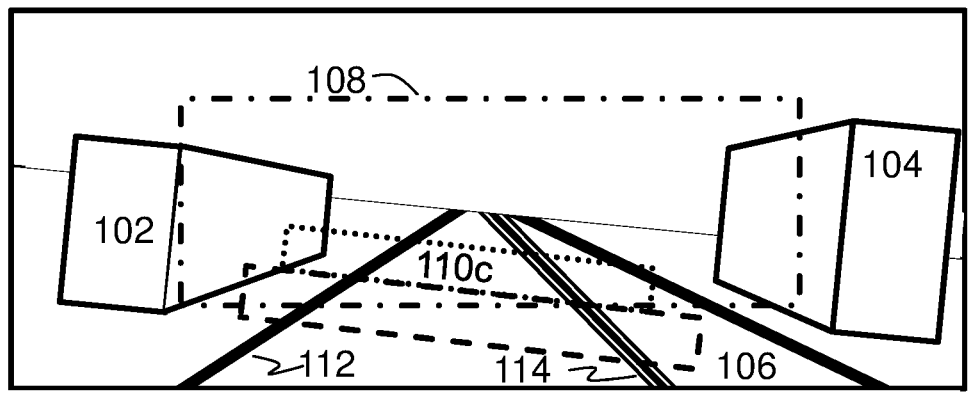

FIGS. 3a-3c show a third simplified scene captured by a camera and a selection of areas in accordance with a third aspect of the invention. The scene shown in FIG. 3a corresponds to the scene shown in FIG. 1a or 2a.

Like in the preceding example, in FIG. 3b the vehicle has moved forward far enough so as to require a new image to be captured, but now the vehicle is rotated around a longitudinal axis, e.g., due to a deformation of the road surface (not shown in the figure). As the camera is fixedly mounted to the vehicle the scene that is captured is rotated, or tilted, accordingly. The first selected area 110a is shown in the figure for reference purposes.

If the second area 110b were selected to be in a location similar to the first selected area with respect to the borders of the image it would be located in the position indicated by the dotted-line area 110b. However, this does not provide a gapless connection between the first and second selected areas in a way that image content found a top border of the first selected area 110 is adjacent to image content found at the lower border of the second selected area 110b. In fact, the second selected area 110b of FIG. 3b would partly cover image content that was already captured at an earlier point in time, and partly leave a gap.

In order to compensate for the motion of the vehicle and the camera the second selected area can be rotated at an angle and, if required, to a location that provides a gapless connection between the first and second areas in accordance with the requirements of the present method. FIG. 3c shows a second selected area 110c that is rotated to be located such that image content at its lower border is seamlessly adjacent to content at the upper border of first selected area 110a. The second selected area 110c is still located within the zone 108 in which the camera optics causes minimum distortion. The motion of the vehicle may be detected using on-board sensors such as accelerometers and gyroscopes, but also by using image recognition techniques, or other suitable techniques.

Figure 4:
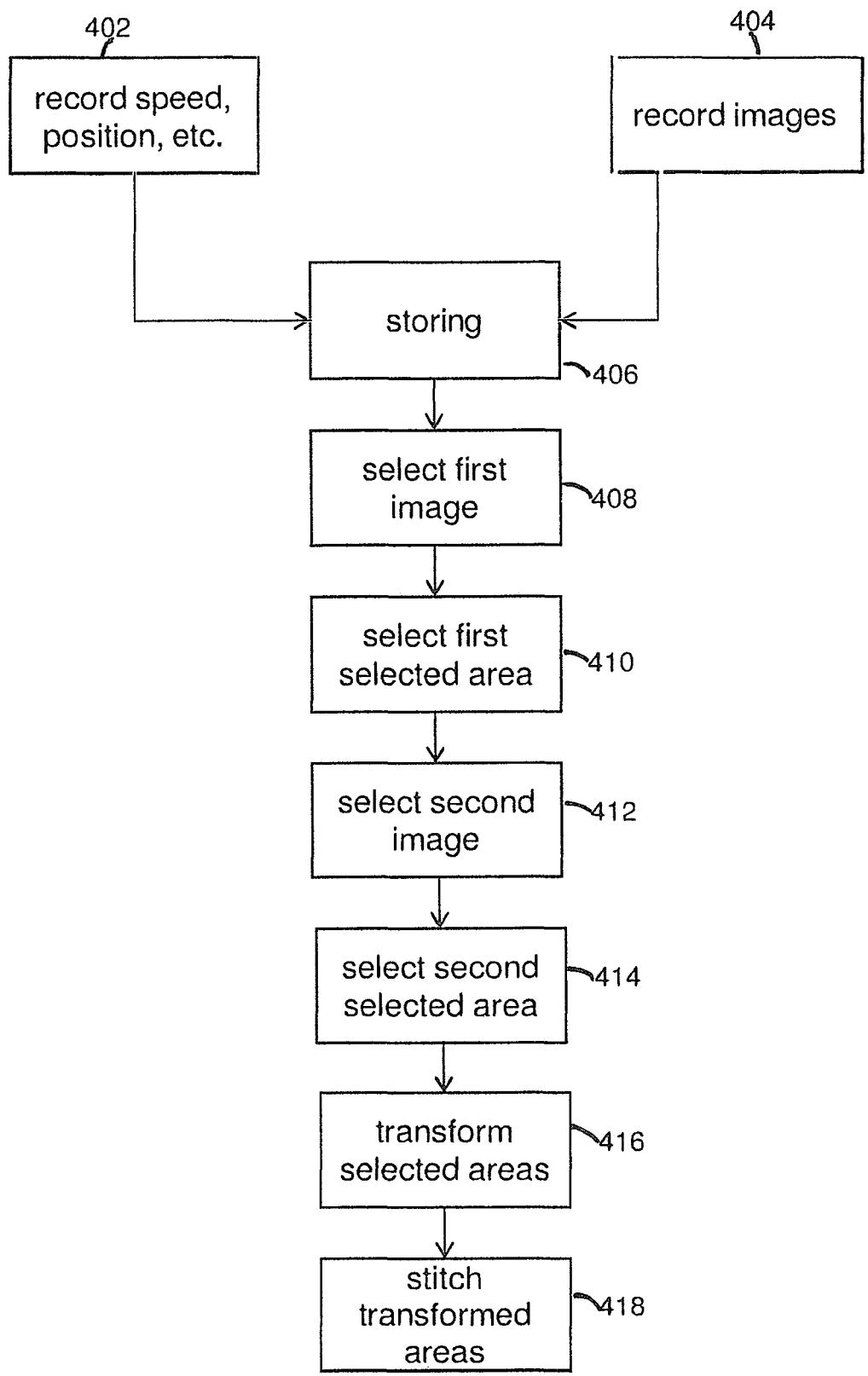
FIG. 4 shows an exemplary simplified flow chart of a method in accordance with an aspect of the invention.

FIG. 4 shows an exemplary simplified flow chart of a method in accordance with an aspect of the invention. In step 402 a speed and/or an acceleration of the vehicle in and/or around each main axis of a three-dimensional space and/or an orientation of the vehicle in the three-dimensional space is recorded. In step 404 a sequence of at least two images is recorded while the vehicle is moving. Steps 402 and 404 are executed repeatedly and may be executed in parallel. The data recorded in steps 402 and 404 are at least temporarily stored in step 406. In step 408 a first image from the sequence of at least two images is selected for further processing, and in step 410 a first selected area is selected in the first selected image. The first selected area is located in a zone of the image in which the camera optics cause minimum distortion. In step 412 a second image from the sequence of at least two images is selected for further processing. The second image is captured later than the first selected image and is selected such that a second area can be selected in the second selected image, in step 414, which second selected area is located in the zone of the image in which the camera optics cause minimum distortion and which second area is located such that image content shown at a lower border of the second area is adjacent to image content shown at an upper border of the first selected area in the first selected image. In step 416 the first and second selected areas are transformed into a top-view perspective, and in step 418 the transformed first and second selected areas are stitched together for generating a composed top-view image.

Figure 5:
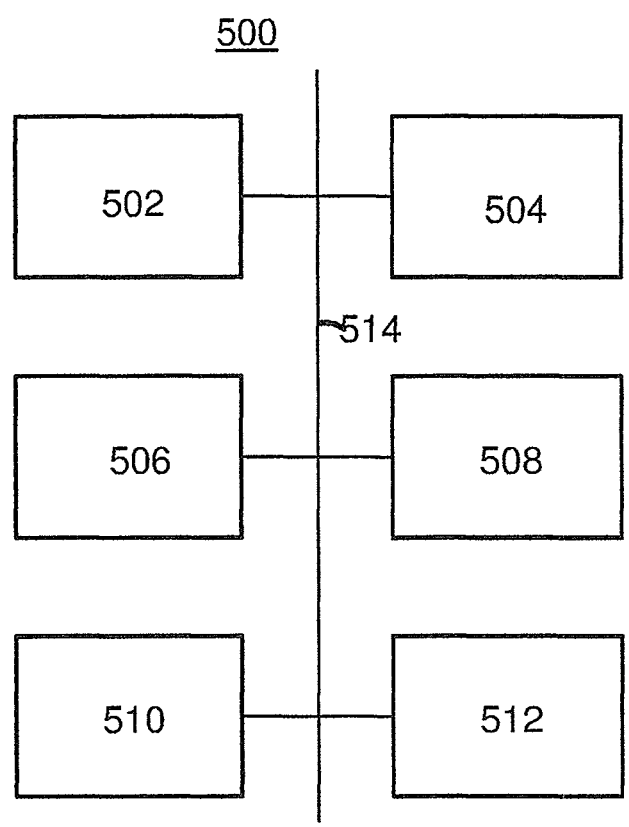
FIG. 5 shows an exemplary simplified block diagram of a system in accordance with one or more aspects of the invention.

FIG. 5 shows an exemplary simplified block diagram of a system 500 in accordance with one or more aspects of the invention. A camera 502, one or more sensors 504, a first module 506 for selecting images, a second module 508 for selecting areas in images, a third module 510 for transforming selected areas into a top-view representation thereof, and a fourth module 512 for composing the transformed selected areas into a composed top-view image are communicatively connected via one or more bus systems 514.

The one or more sensors 504 are adapted to determine movements and/or a position and/or orientation of the vehicle. The first module 506 is adapted to select first and second images in such a way that a zone of minimum distortion caused by camera optics in a second selected image allows for the second module 508 to select a second selected area within that zone of the second image, which second selected area is located such that image content shown at a lower border of the second area is adjacent to image content shown at an upper border of a first selected area that was selected in a corresponding zone of minimum distortion in the first selected image. The third module 510 is adapted to transform the image content of the selected areas into a top-view by applying corresponding image transform functions. The fourth module 512 is adapted to put together the image content of the transformed selected areas to a top-view image such that features and/or elements of the road that extend over two or more selected areas are represented gapless and without distortion.

The first through fourth modules may include one or more microprocessors, random access memory, non-volatile memory and software and/or hardware communication interfaces. The non-volatile may memory store computer program instructions which, when executed by the one or more microprocessor in cooperation with the random access memory, perform one or more processing steps of the method as presented hereinbefore.

Although the preceding description has described exemplary embodiments, it is to be noted that a multiplicity of variations are possible. Moreover, it is to be noted that the exemplary embodiments are merely examples which are not intended to restrict the scope protection, the applications and the construction in any way. Rather, a person skilled in the art is given a guideline for the implementation of at least one exemplary embodiment by the preceding description, it being possible for various modifications to be performed, in particular with regard to the function and arrangement of the described constituent parts, without departing from the scope of protection as arises from the claims and the equivalent combinations of features.

The invention claimed is:

1. A method of generating a composed top-view image of at least a part of a road from at least two images taken by a vehicle-mounted, forwardly-facing camera from a non-vertical perspective with respect to a surface on which a vehicle is moving, the method comprising:
   recording, while the vehicle is moving, at least one of
      a) at least one of a speed and an acceleration of the vehicle under at least one of the following conditions:
         in each main axis of a three-dimensional space;
         around each main axis of the three-dimensional space; and
      b) an orientation of the vehicle in the three-dimensional space;
   recording, while the vehicle is moving, a sequence of at least two images;
   selecting for processing a first image from the sequence of at least two images;
   selecting a first selected area in the first image, the first selected area being located in a zone of the first image in which optics of the camera cause minimum distortion;
   selecting for processing a second image from the sequence of at least two images, the second image being captured later than the first image, wherein the second image is selected such that a second selected area can be selected in the second image, wherein the second selected area is located in a zone of the second image in which the optics of the camera cause minimum distortion, and wherein the second selected area is located such that image content shown at a lower border of the second selected area is adjacent to image content shown at an upper border of the first selected area in the first image;
   transforming the first and second selected areas into a top-view perspective to form a transformed first selected area and a transformed second selected area; and
   stitching the transformed first and second selected areas together to generate a composed top-view image.

2. The method of claim 1, wherein images from the sequence of at least two images are selected for processing depending on at least one selected from the group of: (a) a speed of the vehicle, (b) a rotation of the vehicle around at least one of a longitudinal axis, a transversal axis, and a vertical axis, and (c) a translation of the vehicle along the vertical axis.

3. The method of claim 1, wherein, for each image, a capturing trigger is selected, depending on at least one of: (a) a speed of the vehicle, (b) a rotation of the vehicle around at least one of a longitudinal axis, a transversal axis, and a vertical axis, and (c) a translation of the vehicle along the vertical axis.

4. The method of claim 1, wherein one or both of the first and second selected areas have a quadrilateral shape in which at least two opposite sides are parallel to each other.

5. The method of claim 4, wherein the quadrilateral shape has a width of the shape that is larger than a height of the shape.

6. The method of claim 5, wherein, for each image, a corresponding selected area is selected depending on rotation of the vehicle around a longitudinal axis prevailing at the time when the image was captured.

7. The method of claim 1, further comprising subjecting the composed top-view image to object recognition, to identify features of the road.

8. The method of claim 7, further comprising, for each identified feature of the road, determining a location from a) recorded data representing vehicle speed and acceleration, optical characteristics of the camera, characteristics of transformation applied for generating the composed top-view image, and from b) reference features identified in the composed top-view image.

9. The method of claim 8, further comprising, for each identified feature of the road for which said location is determined, determining a digital representation of the identified feature of the road in a three-dimensional vector format.

10. A system for generating a composed top-view image from at least two images taken by a vehicle-mounted, forward-facing camera from a non-vertical perspective with respect to a surface on which a vehicle is moving, the system comprising:
   the vehicle-mounted, forward-facing camera configured to record a sequence of the at least two images while the vehicle is moving;
   sensors configured to determine at least one of movements, a position, and an orientation of the vehicle and to produce sensor data; and
   a storage configured to record the sensor data and camera-taken images, the system further comprising:

a first module adapted to select a first image and a second image;

a second module adapted to select a first selected area in the first image and a second selected area in the second image, wherein the first module selects the second image such that a zone of minimum distortion caused by camera optics in the second image allows for the second module to select a second selected area within that zone of the second image, the second selected area being located such that image content shown at a lower border of the second selected area is adjacent to image content shown at an upper border of the first selected area that was selected in a corresponding zone of minimum distortion in the first selected image;

a third module configured to transform image content of the first and second selected areas into a top-view perspective by applying corresponding image transform functions; and a fourth module configured to put together the image content of so-transformed first and second selected areas to a composed top-view image such that at least one of features and and/or elements of the road that extend over two or more selected areas are represented gapless and without distortion.

* * * * *